(12) United States Patent
Chang et al.

(10) Patent No.: US 10,790,631 B2
(45) Date of Patent: Sep. 29, 2020

(54) HIGH ENERGY BROADBAND LASER SYSTEM, METHODS, AND APPLICATIONS

(71) Applicant: UNIVERSITY OF CENTRAL FLORIDA RESEARCH FOUNDATION, INC., Orlando, FL (US)

(72) Inventors: Zenghu Chang, Orlando, FL (US); Xiaoming Ren, Orlando, FL (US); Yanchun Yin, Orlando, FL (US); Lam Mach, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 16/032,808

(22) Filed: Jul. 11, 2018

(65) Prior Publication Data

US 2019/0020166 A1 Jan. 17, 2019

Related U.S. Application Data

(60) Provisional application No. 62/531,042, filed on Jul. 11, 2017.

(51) Int. Cl.
*H01S 3/00* (2006.01)
*H01S 3/23* (2006.01)
(Continued)

(52) U.S. Cl.
CPC .......... *H01S 3/0057* (2013.01); *H01S 3/0092* (2013.01); *H01S 3/1623* (2013.01);
(Continued)

(58) Field of Classification Search
CPC .... H01S 3/0092; H01S 3/0057; H01S 3/1623; H01S 3/2316; H01S 3/1636; H01S 3/1625

See application file for complete search history.

(56) References Cited

U.S. PATENT DOCUMENTS 6,021,154 A * 2/2000 Unternahrer ........... B23K 26/06
372/108

OTHER PUBLICATIONS

Yin et al., "Towards Terawatt Sub-cycle Long-Wave Infrared Pulses via Chirped Optical Parametric Amplification and Indirect Pulse Shaping," Apr. 2017,Scientific Reports, 7, 45794, p. 1-10. (Year: 2017).*

(Continued)

*Primary Examiner* — Michael Carter
(74) *Attorney, Agent, or Firm* — Suiter Swantz pc llo

(57) ABSTRACT

The present invention demonstrates a technique for achieving milli-joule level and higher energy, broad bandwidth laser pulses centered around 2.4 micrometer with a kilohertz and other repetition rate. The key to such technique is to start with a broadband micro-joule level seed laser at around 2.4 micrometer, which could be generated through difference frequency generation, four-wave mixing process and other methods. This micro-joule level seed laser could then be amplified to above one milli-joule through chirped pulse amplification in a Cr2+:ZnSe or Cr2+:ZnS crystal pumped by a commercially available Ho:YAG or other appropriate suitable lasers. Due to the high seed energy, fewer gain passes are needed to achieve a milli-joule level output thus significantly simplifies laser architectures. Furthermore, gain narrowing effect in a typical chirped pulse amplifier is also mitigated and thus enable a broadband output.

20 Claims, 3 Drawing Sheets

(51) Int. Cl.
*H01S 3/16* (2006.01)
*H01S 3/115* (2006.01)
*H01S 3/06* (2006.01)
*H01S 3/094* (2006.01)

(52) U.S. Cl.
CPC .......... *H01S 3/1628* (2013.01); *H01S 3/2308* (2013.01); *H01S 3/2316* (2013.01); *H01S 3/0606* (2013.01); *H01S 3/094076* (2013.01); *H01S 3/115* (2013.01); *H01S 3/161* (2013.01); *H01S 3/1625* (2013.01); *H01S 3/1636* (2013.01); *H01S 3/1643* (2013.01); *H01S 3/2325* (2013.01); *H01S 3/2375* (2013.01)

(56) References Cited

OTHER PUBLICATIONS

Yin et al., "High-efficiency optical parametric chirped pulse amplifier in BiB3O6 for generationof 3 mJ, two cycle, carrier-envelope-phase-stable pulses at 1.7 μm," Mar. 2016, Optics Letters, vol. 41, No. 6, 1142-1145. (Year: 2016).*

Li, "Carrier-envelope phase shift caused by variation of grating separation," Nov. 1, 2006, Optics Letters, vol. 31, No. 21, pp. 3113-3115. (Year: 2006).*

\* cited by examiner

HIGH ENERGY BROADBAND LASER SYSTEM, METHODS, AND APPLICATIONS

CROSS-REFERENCE TO RELATED APPLICATION

This application claims priority to U.S. Provisional Patent Application Ser. No. 62/531,042, filed on Jul. 11, 2017 and entitled "High energy broadband laser system, Methods, and Applications," the entire disclosure of which is incorporated herein by reference.

GOVERNMENT FUNDING

This invention was made with Government support under ARO contract # W1911NF-14-1-0383, and AFOSR contract # FA9550-15-1-0037. The United States Government has certain rights in the invention.

FIELD OF THE INVENTION

The present disclosure is directed generally to a high energy broadband laser system, method and applications for use thereof.

BACKGROUND

Ultrafast lasers are capable of emitting ultrafast light flashes over an extremely short period of time, on the order of tens of femtosecond or even attosecond (1 femtosecond=$10^{-15}$ second, 1 attosecond=$10^{-18}$ second). Such lasers have contributed remarkably to both industry and scientific research.

In the time domain, due to the concentration of energy in such short period of time, very high laser intensity, defined as the amount of laser energy per unit of time and per unit of area, can be achieved without supplying too much of heat; therefore, ultrafast lasers are widely applied in e.g., fine material processing and delicate surgeries. Owing to the rapid development of Ti:sapphire laser systems and chirped pulse amplification (CPA) techniques, ultrafast lasers are readily available with very high pulse energies and which can be focused to an intensity that is sufficient to remove and accelerate electrons from an atomic or molecular system. The consequence of such processes is the emission of coherent XUV light and the birth of attosecond science, the importance of which includes enabling smaller transistors and thus faster chips in semiconductor industries and enabling ultrafast dynamic imaging with unprecedented temporal resolution, respectively.

In the spectral domain, ultrafast lasers naturally cover a broad bandwidth, which permits simultaneous detection of various absorption features that can reveal the compositions of certain materials and gases. Remote sensing is one of the most important applications, enabling light detection and ranging (LIDAR), which is widely used in environmental imaging, storm surge modeling, and emerging applications in autonomous vehicles.

For some time, Ti:sapphire lasers have been the dominant source of ultrafast lasers, which deliver 800 nanometer (nm) laser pulses having durations normally around 30 femtosecond (fs). There have been tremendous successes with Ti:sapphire lasers in many areas worldwide. Recently, both industry and universities have exhibited a strong demand for ultrafast lasers with longer wavelength in the short to mid-infrared region. On one hand, the short to mid-infrared region covers absorption features of many important molecules such as water, ammonia, carbon-monoxide, carbon-dioxide, and so on. This so called 'molecular fingerprint' region has very important applications in remote sensing and environmental control. On the other hand, longer wavelength means more time to accelerate electrons; more energetic electrons will convert to higher energy photons, thus triggering the generation of coherent soft x-ray or even hard x-ray lasers. This will bring significant impact to biomedical imaging and life sciences. Therefore, developing a broadband high pulse energy, short to mid-infrared laser would be extremely advantageous for realizing important industrial and scientific applications.

There are mainly two ways to attain such laser pulses. One is through optical parametric amplification (OPA) and the other through chirped-pulse amplification (CPA). While OPA preserves the seed bandwidth and can deliver a high pulse energy output with a broad bandwidth, it is limited by the availability of high power pump lasers with femtosecond to picosecond pulse duration. In contrast, the nanosecond long pump lasers for CPA are readily available with much higher pulse energies; however, CPA usually suffers from gain narrowing, limiting the bandwidth of the output laser.

Accordingly, there is a need in the art for a high energy laser system that uses a high energy seed, the gain narrow effect being mitigated and resulting in a laser bandwidth that could support laser pulses with only a few optical cycles.

SUMMARY

The present disclosure is directed to a high energy broadband laser system.

In one embodiment, a broad bandwidth, micro-joule energy level seed pulses centered at 2.4 results in a simplified architecture of the CPA system and significantly mitigates the gain narrowing effect. The embodiment has been demonstrated to achieve 1 mJ pulse energy at 1 kHz repetition rate centered at 2.4 The demonstrated full width half maximum (FWHM) bandwidth of the output is 300 nm compared to an input bandwidth of 350 nm. The bandwidth of the laser pulses going through the CPA is only reduced by 14% without taking into account gain crystal absorption.

According to an aspect is a method for creating broadband high energy laser pulses centered around 2.4 μm, comprising: generating broadband laser seed pulses having a bandwidth equal to or greater than 350 nm centered around 2.4 μm and an energy level equal to or greater than 10 μJ; amplifying the laser seed pulses to an energy greater than one milli-joule (>$10^{-3}$ J); and producing laser output pulses having a bandwidth as close as the input and with an energy equal to or greater than one milli-joule (>$1\times10^{-3}$ J).

According to an embodiment, the method further comprises amplifying the micro-joule level laser seed pulses to an energy equal to or greater than one milli-joule by chirped pulse amplification in a $Cr^{2+}$:ZnSe or $Cr^{2+}$:ZnS crystal.

According to an embodiment, the method further comprises pumping the $Cr^{2+}$:ZnSe or $Cr^{2+}$:ZnS crystal by a Ho:YAG or other appropriate pump laser having a spectral output from 1.3 μm to 2.2 μm.

According to an embodiment, the method further comprises amplifying the laser seed pulses in a single amplifier stage having a gain equal to or less than $10^3$.

According to an embodiment, the method further comprises generating the broadband laser seed pulses by one of a difference frequency generation, four-wave mixing, and self-phase modulation process.

According to an embodiment, the method further comprises generating the broadband laser seed pulses using few-cycle pulses from a Ti:sapphire laser system.

According to an embodiment, the method further comprises generating the few-cycle pulses by propagating the Ti:sapphire laser output through a noble gas-filled hollow-core fiber for white light generation followed by chirped-mirror pairs and fused silica compensation plates.

According to an embodiment, the method further comprises loosely focusing the few-cycle pulses into a BIBO crystal having an optical axis that is rotated away from the input laser polarization to allow Type I phase matching for an intra-pulse DFG process, and generating an idler beam that covers the gain spectrum of the $Cr^{2+}$:ZnSe crystal, having an energy ≥10 µJ.

According to an aspect is high energy, a broadband laser system is provided, comprising: a seed pulse-generating component configured to generate few-cycle pulses, including: a conventional Ti:sapphire laser having a pulsed laser output; an output pulse-bandwidth-broadening component assembly disposed to receive the Ti:sapphire pulsed laser output and output the few-cycle pulses; and a nonlinear medium disposed to receive the few-cycle pulses and output a seed pulse; and a chirped pulse amplifier (CPA) component, including: a pulse stretcher and a single-stage amplifier with an associated pump laser, disposed to receive the seed pulse and output a laser pulse having a bandwidth as close as the input with an energy equal to or greater than one milli-joule ($>1\times10^{-3}$ J).

According to an embodiment, the output pulse-bandwidth-broadening component assembly comprises a noble gas-filled hollow-core fiber.

According to an embodiment, the nonlinear medium is a BIBO crystal.

According to an embodiment, the output seed pulse has an energy >10 µJ.

According to an embodiment, the output seed pulse has a bandwidth equal to or greater than 350 nm centered around 2.4 µm.

According to an embodiment, the single-stage amplifier comprises one of a $Cr^{2+}$:ZnSe or a $Cr^{2+}$:ZnS crystal.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

The present disclosure describes a high energy laser system that uses a high energy seed, the gain narrow effect being mitigated and resulting in a laser bandwidth that could support laser pulses with only a few optical cycles.

The embodied invention is based on conventional CPA, which is widely used in high energy Ti:sapphire laser systems; however, now at a wavelength centered around 2.4 µm rather than 800 nm. The gain crystal is $Cr^{2+}$:ZnSe crystal (or $Cr^{2+}$:ZnS crystal with a slightly blue shifted emission spectrum), which is capable of emitting a broadband laser output covering 1.8 µm to 3.3 µm when pumped at 1.3 µm to 2.2 µm. In an illustrative embodiment, a high energy, 1 kHz Ho:YAG laser at 2.09 µm is used as the pump. Other pumping sources ranging from 1.3 µm to 2.2 µm with sufficient energy are also applicable.

The significant difference between the embodied CPA and conventional CPA lies in the seed. In a conventional $Cr^{2+}$:ZnSe CPA system the seed is generated from a $Cr^{2+}$:ZnSe oscillator, which provides nJ energy level pulses with limited bandwidth. Amplifying such pulses to mJ level with a gain of 106 inevitably suffers from gain narrowing, limiting the bandwidth of the output pulses. Moreover, such laser systems often require complicated architectures and multiple amplification stages, making such systems hard to build and maintain. By using micro-joule level seed pulses with a much broader bandwidth, the gain is reduced by a factor of one thousand, therefore, a much simpler CPA architecture is realized and much broader bandwidth can be attained.

In order to generate µJ energy level, broadband seed pulses within the desired gain bandwidth of the $Cr^{2+}$:ZnSe crystal, processes involving three-wave mixing or four-wave mixing in a nonlinear crystal or isotropic high pressure gas are normally used. In such processes, different spectral components of milli-joule broadband inputs are mixed and frequency down-converted to the desired bandwidth and pulse energy. There are several ways of generating such seed pulses including four-wave mixing in air by focusing a Ti:sapphire output and its second harmonic, idler pulse generation from an optical parametric amplification process, and others known in the art.

Figure 1:
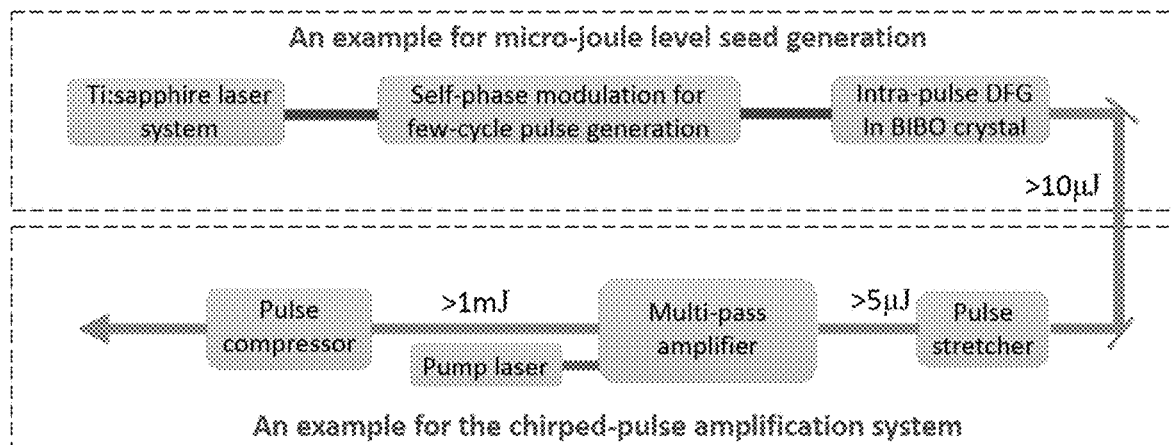
FIG. 1 is an illustration of the system used in demonstration, in accordance with an embodiment.

In the embodied invention, a mature technology is used starting with few-cycle pulse generation from a conventional Ti:sapphire laser system. As depicted in FIG. 1, the few-cycle laser pulses are generated by focusing a 1 kHz, 2 mJ, 30 fs Ti:sapphire laser output into a Neon gas-filled hollow-core fiber for white light generation followed by chirped-mirror pairs and fused silica compensation plates, out of which few-cycle laser pulses are generated. Those laser pulses are then loosely focused into a 0.8 mm thick BIBO crystal. The BIBO crystal is placed a few cm in front of the focus to avoid optical damage. The optical axis of the BIBO crystal is rotated away from the input laser polarization to allow Type I phase matching for an intra-pulse DFG process. The generated idler covers the gain spectrum of the $Cr^{2+}$:ZnSe crystal and has an energy above 10 µJ. It is noted that examples for micro-joule level seed generation and CPA system can be replaced by other suitable methods or architectures to achieve the same output.

Figure 2:
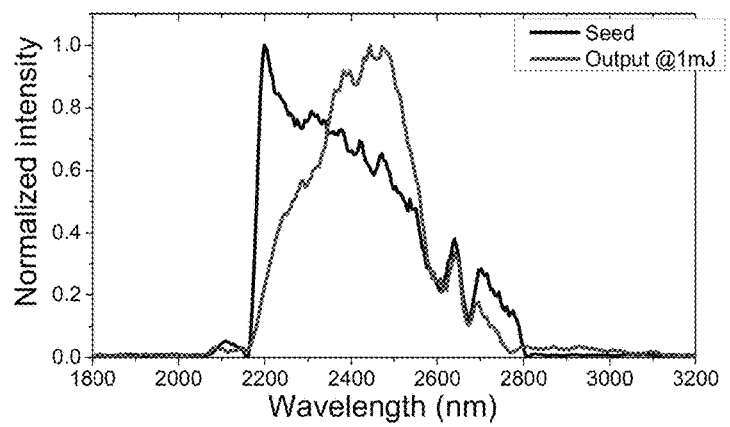
FIG. 2 is a laser spectrum of the input and output of a $Cr^{2+}$:ZnSe CPA system, in accordance with an embodiment.

Following the conventional CPA technique, the pulse duration of the 10 µJ laser is first stretched to about 300 ps. The stretched laser with 5 µJ pulse energy is then used to seed the $Cr^{2+}$:ZnSe amplifier. The spectrum of the input laser is depicted in FIG. 2. Different type of amplifiers can be utilized to boost the laser energy, including a multi-pass amplifier and a regenerative amplifier. For demonstration, a single-stage, multi-pass amplifier was used by passing the seed through the crystal multiple times with a beam size of 1 mm inside the crystal to extract energy from the Ho:YAG pump laser with 15 mJ energy and 1.2 mm beam size. After only six passes, it was able to attain output pulse energy above 1 mJ, the spectrum of which is also depicted in FIG.

2. Due to the higher seed energy and therefore lower gain, the bandwidth of the laser is more or less preserved through the CPA process with an input bandwidth of 350 nm and an output of 300 nm. There is strong absorption from the crystal at about 2.2 μm, which is not taken into account; the actual gain narrowing should be even less. Nevertheless, it is clear that much simpler laser architecture and much less gain narrowing are achieved by using a μJ level seed energy.

Figure 3:
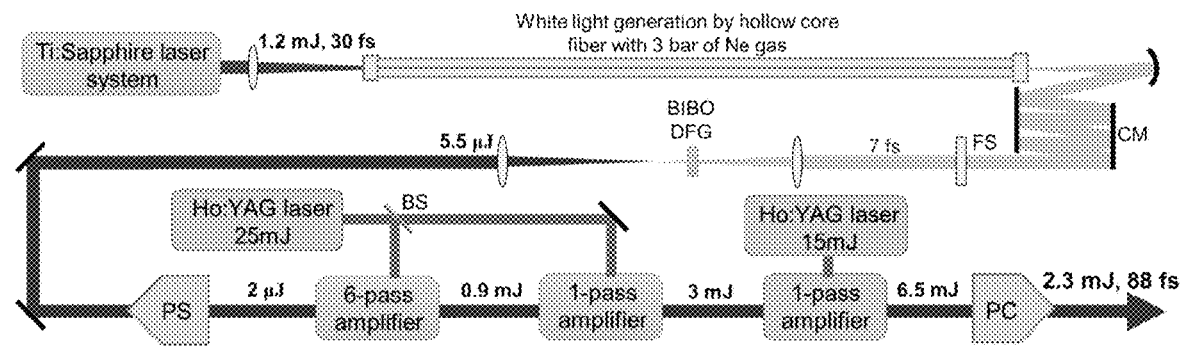
FIG. 3 is an illustration of a laser system, in accordance with an embodiment.

Referring to FIG. 3 is an embodiment of a laser system as described or otherwise envisioned herein. According to this embodiment, the laser system is a 2.3 mJ, 88 fs, 2.5 μm $Cr^{2+}$:ZnSe CPA laser operating at 1 kHz repetition rate. The high pulse energy and short pulse duration are enabled by using a μJ level ultra-broadband seed laser. This laser system provides the highest peak power ever achieved at 2.5 μm with 1 kHz repetition rate.

According to the embodiment depicted in FIG. 3, the frontend features a home-built Ti:Sapphire CPA laser generating 1.2 mJ and 30 fs pulses at a repetition rate of 1 kHz. These pulses are loosely focused by a 2 m focal length lens into a stretched hollow-core fiber (HCF) filled with 3 bar of Neon gas for white light generation. Sets of chirped mirrors and fused silica plates are used to compress the HCF output to around 7 fs, which is then focused into a 0.8 mm BIBO crystal cut at 10.3° for intrapulse DFG. The crystal is cut for Type I phase matching and the e axis of the crystal is rotated 8° away from the HCF output polarization to allow a maximum DFG output of 5.50 μJ following a cascade process.

Figure 4:
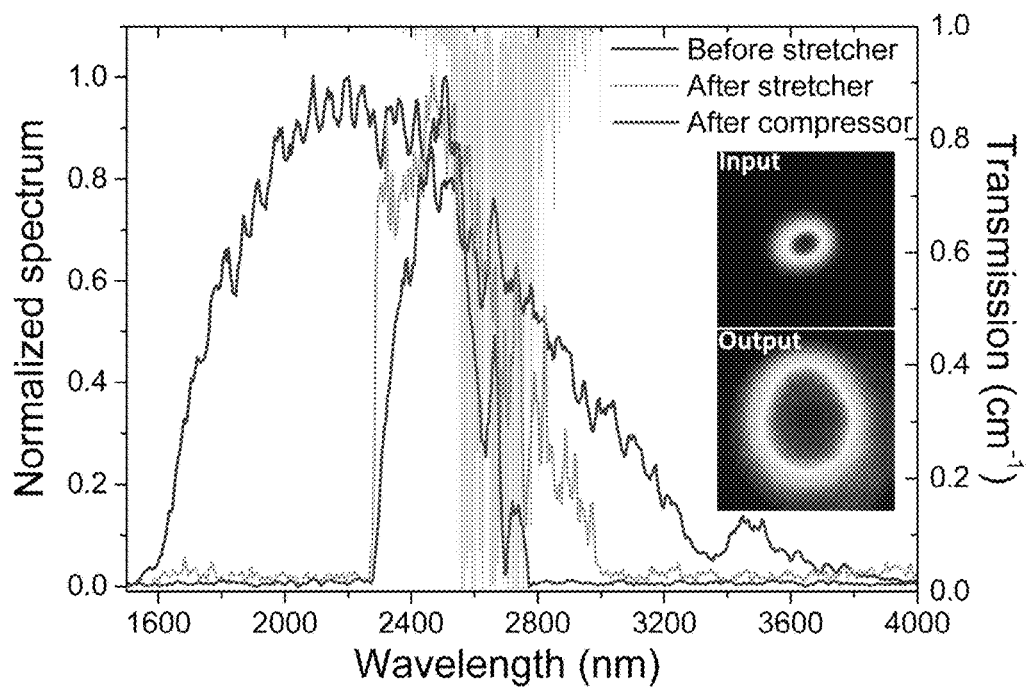
FIG. 4 is a a power spectrum and spatial profile of this embodiment of the laser system before and after the Cr2+:ZnSe CPA system, in accordance with an embodiment.

According to an embodiment, the DFG output has an octave-spanning spectrum covering from 1.6 to around 3.6 μm with a nice Gaussian beam profile, as shown in FIG. 4. FIG. 4 depicts a power spectrum and spatial profile of this embodiment of the laser system before and after the $Cr^{2+}$:ZnSe CPA system. The black curve shows the seed spectrum after the DFG. The orange curve denotes the laser spectrum after the stretcher. The green curve represents the final output laser spectrum after the pulse compressor. Shaded gray lines on the top axis show the power transmission through 1 cm of water vapor at normal condition. The insets in FIG. 4 depict the input and output beam profile measured with Spiricon Pyrocam IIIHR beam profiling camera.

Returning to FIG. 3, the DFG output is used as the seed for the $Cr^{2+}$:ZnSe CPA laser. As in the standard CPA architecture, the seed is first stretched to about 300 ps in an all-reflective Offner-type pulse stretcher. The stretcher employs a ruled reflective grating with a 300 l/mm groove density and gives a 2 μJ output whose spectrum is truncated between 2.2 and 3 μm (see FIG. 4) due to limited retro-reflective mirror size in the stretcher. Note that the output spectral range can be easily tuned by changing the angle of the grating and this specific range is chosen to overlap with the peak of the emission spectrum of the $Cr^{2+}$:ZnSe crystal as well as mitigating strong absorption of the gain crystal below 2.2 μm.

The first-stage multi-pass amplifier employs a 30 mm-long, Brewster-angle-cut (67.7°) polycrystalline $Cr^{2+}$:ZnSe crystal (IPG Photonics Inc.) having a 95% absorption at 2.09 μm. A Tm-fiber laser-pumped, Q-switched Ho:YAG laser at 2.09 μm with 25 mJ pulse energy at 1 kHz (IPG Photonics Inc.) is used as the pump laser for the amplifier. 50% of the total energy (12 mJ) is focused to the crystal with a spot size of around 1.2 mm overlapping with the 1 mm seed at focus. The seed is refocused back into the crystal after each pass to maintain a constant spot size. After 6 passes, 900 μJ of pulse energy is achieved with a cumulative gain of 450. The first-stage output is then resized to around 2 mm and sent to the second-stage amplifier employing a 40 mm-long polycrystalline $Cr^{2+}$:ZnSe rectangular slab. The crystal absorbs 99% of the pump power and is anti-reflection coated from 1.9 to 3 μm. The remainder of the first stage pump (12 mJ) is sent to the second-stage crystal with a spot size of 2 mm and boosts the energy to 3 mJ with a single pass. Strong thermal lensing effect causes the output to focus after the crystal. To prevent optical damage, the second-stage output is picked off after the focus, resized to 2.5 mm, and sent to the third stage crystal (same as the second-stage crystal). Another Tm-fiber laser-pumped, Q-switched Ho:YAG laser at 2.09 μm with 50 mJ pulse energy at 1 kHz (IPG Photonics Inc.) is used to pump the last stage. With 15 mJ pumping energy and 2.5 mm pump size, 6.5 mJ output energy is achieved with one pass. Further increasing the pump energy leads to gain saturation. Enlarging the pump and seed beam size would allow for more pump energy to be stored in the gain crystal, potentially leading to higher output energy with a chance of introducing thermally-induced spatial distortion on the pump beam along with other thermal problems. Note that all crystals are water-cooled to 15° C.

Finally, to avoid damaging the compressor gratings, the amplifier output is resized to 10 mm and sent to the pulse compressor consisting of two ruled reflective gratings with 300 l/mm groove density. Considering surface losses along the beam path from the third-stage output, the compressor throughput efficiency is estimated to be around 60% yielding 3 mJ of pulse energy at the exit. The spectrum of the final output is shown in FIG. 4 along with its superb spatial profile. The spectrum is narrower than the input, which can be attributed to the crystal absorption at the shorter wavelength side and strong water vapor absorption at the longer wavelength side. A broader spectrum is expected by purging the entire system with dry air or nitrogen. The absorption of the crystal can be mitigated at the cost of slightly reduced output power by tuning the angle of the stretcher grating shifting the seeding spectrum towards longer wavelengths while purging. Nevertheless, the output spectrum can support a transform limited (TL) pulse duration of 40 fs, corresponding to five-cycle pulses at 2.5 μm.

Figure 5:
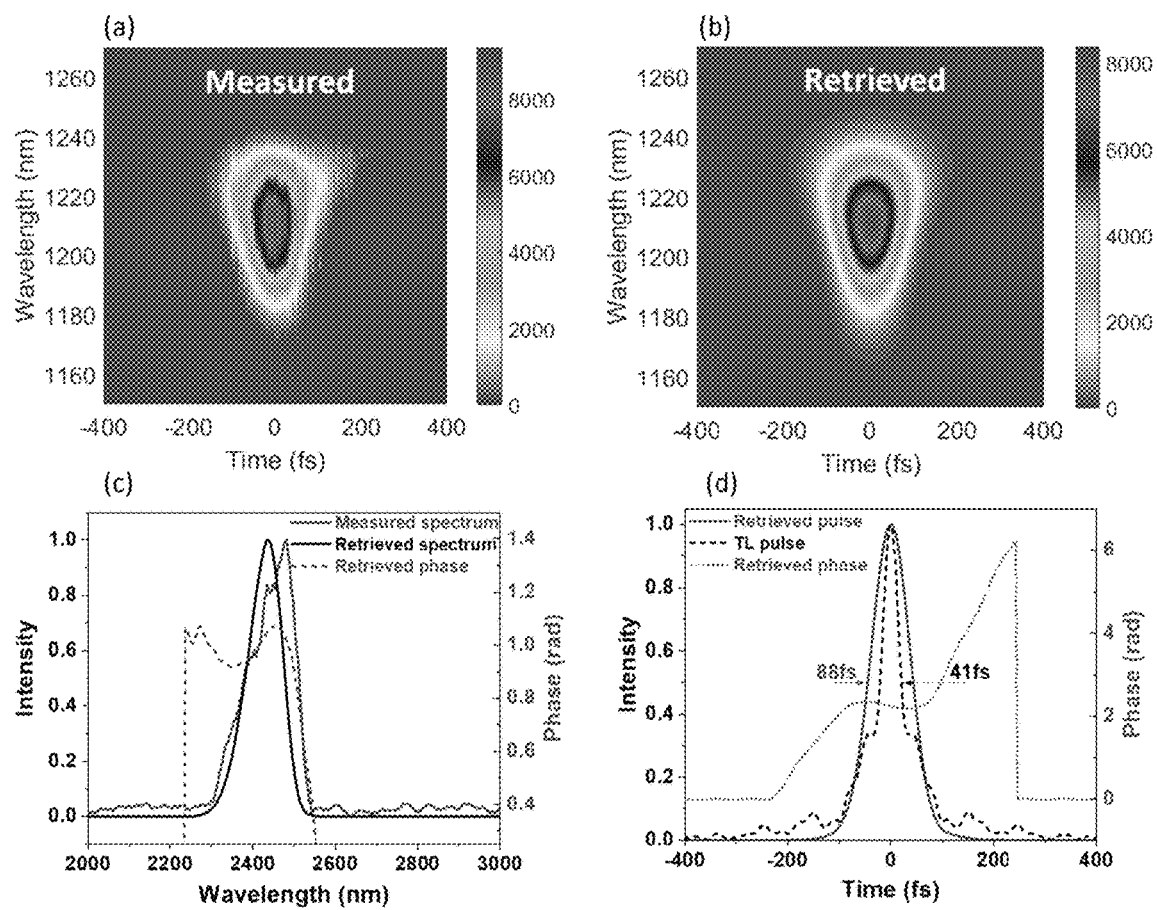
FIG. 5 is a FROG spectrogram and analysis, in accordance with an embodiment.

Referring to FIG. 5 are graphs of FROG measurement and retrieval. FIG. 5(a) depicts a measured FROG trace, FIG. 5(b) depicts a retrieved FROG trace, FIG. 5(c) depicts a red curve showing the measured spectrum with spectral filtering, a black curve showing the retrieved spectrum, and the green dashed curve showing the retrieved spectral phase. FIG. 5(d) shows a red curve depicted a retrieved pulse intensity profile; a green dotted curve showing a retrieved temporal phase; and a black dashed curve showing a transform limited pulse supported by the clipped spectrum (red curve in panel (c)). To measure the pulse duration, a single-shot second-harmonic frequency-resolved optical gating (SH-FROG) measurement was performed by splitting the output beam spatially into two halves and cross overlapping the splitted portions in a 100 μm thick BBO crystal cut for 2.5 μm. The measured and retrieved FROG traces are shown with very good agreement in FIGS. 5(a) and (b), respectively.

Note that, the SH bandwidth only extends to around 1240 nm (corresponding to 2480 nm of the fundamental spectrum), which is much lower than the upper limit of the measured fundamental spectrum. This is due to the strong water absorption at the red side of the spectrum that severely distorts the spectral phase causing the spectral region above 2480 nm to be uncompressible. To prevent discrepancy between measured and retrieved spectra as well as to get the real compressed pulse energy, a spectral filter is placed in the compressor to block the uncompressible portion of the spectrum while keeping the FROG spectrogram unchanged. The red curve in FIG. 5(c) shows the measured spectrum after spectral filtering. The measured and retrieved spectra are in good agreement indicating a reliable retrieval with a retrieved pulse duration of 88 fs. The corresponding pulse energy drops from 3 mJ to 2.3 mJ, indicating a peak power of 26 GW at 1 kHz. The pulse duration and peak power are expected to improve further once the entire laser system is purged.

It is also worth mentioning that the seed laser can be generated from an intrapulse DFG process, which provides passive carrier-envelope-phase (CEP) stability. The final output should inherit such stability, which makes the laser source extremely valuable to the field of attosecond science. Although it is well known that grating-based stretcher and compressor can introduce large noise to the CEP, the CEP stability needs to be measured and active feedback controls are necessary to provide a stable CEP output.

Thus, the laser system demonstrates the highest peak power at 2.5 μm with a 2.3 mJ pulse energy and 88 fs pulse duration operating at 1 kHz. Such laser is enabled by a μJ level broadband seed laser followed by a three-stage $Cr^{2+}$:ZnSe CPA laser. In the field of attosecond science, the generated harmonic cutoff scales quadratically with the driving laser's wavelength λ, meanwhile the single atom response for generating high energy photons drastically drops as λ-5~6. The high peak power of the laser at 2.5 μm could be a powerful source in the generation of high-flux attosecond pulses with photon energy extending beyond the water window and towards the keV region.

The following references are incorporated by reference:
1. Irina T. Sorokina, et al., Femtosecond Cr2+-Based Lasers, IEEE Journal of Selected Topics in Quantum Electronics, 21, 1, 2015.
2. Evgeny Slobodchikov, et al., High peak power ultrafast Cr:ZnSe oscillator and power amplifier, Solid State Lasers XXV: Technology and Devices, Proc. of SPIE Vol. 9726, 972603, 2016.
3. Takao Fuji, et al., Generation of sub-two-cycle mid-infrared pulses by four-wave mixing through filamentation in air, Optics Letters 32, 22, 2007.
4. D. Brida, et al., Two-optical-cycle pulses in the mid-infrared from an optical parametric amplifier, Optics Letters, 33, 24, 2008.
5. www.nature.com/scientificreports, Yanchun Yin, et al., Towards Terwatt Sub-Cycle Long-Wave Infrared Pulses via ChirpedOptical Parametric Amplification and Indirect Pulse Shaping, Published Apr. 3, 2017.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A laser system comprising:
    a seed laser configured to generate seed pulses, the seed pulses including a wavelength of 2.4 μm, the seed pulses further having pulse energies of at least 5 μJ, the seed laser comprising:
        a source laser to generate source pulses, the source pulses not including a wavelength of 2.4 μm; and
        a conversion medium configured to generate the seed pulses from the source pulses using a non-linear optical process; and
    a chirped pulse amplifier to amplify the seed pulses by stimulated emission in an optically-pumped gain medium and provide the amplified seed pulses as output pulses, wherein the output pulses have pulse energies of at least 1 mJ.

2. The laser system of claim 1, wherein the non-linear optical process comprises:
    a non-linear cascade process.

3. The laser system of claim 1, wherein the non-linear optical process comprises:
    a difference frequency generation process.

4. The laser system of claim 3, wherein the conversion medium comprises:
    a BIBO crystal configured for Type I phase matching.

5. The laser system of claim 1, wherein at least one of the seed pulses or the output pulses comprise:
    few-cycle pulses.

6. The laser system of claim 1, wherein the source laser comprises:
    an input laser to generate input pulses; and
    a spectrum-broadening medium configured to increase a bandwidth of the input pulses using a white light generation process to generate the source pulses; and
    a compressor to temporally compress the source pulses, wherein the source pulses have a smaller pulse duration than the input pulses.

7. The laser system of claim 6, wherein the spectrum-broadening medium comprises:
    a hollow-core fiber filled with a noble gas.

8. The laser system of claim 7, wherein the noble gas comprises:
    neon.

9. The laser system of claim 6, wherein the input laser comprises:
    a Ti:sapphire laser.

10. The laser system of claim 1, wherein the gain medium of the chirped pulse amplifier comprises:
    a chromium-doped crystal.

11. The laser system of claim 1, wherein the gain medium of the chirped pulse amplifier comprises:
    at least one of a $Cr^{2+}$:ZnSe or a $Cr^{2+}$:ZnS crystal.

12. The laser system of claim 1, wherein the chirped pulse amplifier comprises:
    a single-stage chirped pulse amplifier.

13. The laser system of claim 1, wherein the chirped pulse amplifier comprises:
    a multi-stage chirped pulse amplifier.

14. The laser system of claim 1, wherein the pulse energies of the seed pulses are selected to provide that gain narrowing in the chirped pulse amplifier is less than a selected threshold.

15. The laser system of claim 14, wherein a bandwidth of the seed pulses is reduced by no more than 14% in the chirped pulse amplifier.

16. The laser system of claim 1, wherein the chirped pulse amplifier amplifies has a gain of not more than 1000.

17. The laser system of claim 1, wherein a spectrum of the seed pulses is centered around a wavelength in the range of 2.4 µm to 2.5 µm.

18. The laser system of claim 1, wherein the output pulses have a pulse energy greater than 2 mJ, wherein the output pulses have pulse durations less than 90 femtoseconds.

19. A laser system comprising:
a seed laser configured to generate seed pulses, the seed pulses including a wavelength of 2.4 µm, the seed pulses further having pulse energies of at least 5 µJ, the seed laser comprising:
an input laser to generate input pulses; and
a spectrum-broadening medium configured to increase a bandwidth of the input pulses using a white light generation process to generate source pulses; and
a compressor to temporally compress the source pulses, wherein the source pulses have a smaller pulse duration than the input pulses, the source pulses not including a wavelength of 2.4 µm;
a conversion medium configured to generate the seed pulses from the source pulses using a difference frequency generation process;
a chirped pulse amplifier to amplify the seed pulses by stimulated emission in an optically-pumped gain medium and provide the amplified seed pulses as output pulses, wherein the output pulses have pulse energies of at least 1 mJ.

20. A method comprising:
generating seed pulses with a seed laser, the seed pulses including a wavelength of 2.4 µm, the seed pulses further having pulse energies of at least 5 µJ, the seed laser comprising:
a source laser to generate source pulses, the sources not including a wavelength of 2.4 µm; and
a conversion medium configured to generate the seed pulses from the source pulses using a non-linear optical process; and
amplifying the seed pulses with a chirped pulse amplifier, wherein the chirped pulse amplifier amplifies the seed pulses by stimulated emission in an optically-pumped gain medium and provides the amplified seed pulses as output pulses, wherein the output pulses have pulse energies of at least 1 mJ.

* * * * *